(No Model.) 2 Sheets—Sheet 1.

W. V. ESMOND.
ROLL HOLDING CAMERA.

No. 552,633. Patented Jan. 7, 1896.

Witnesses:
Jno. A. Christianson
W. C. Coelice

Inventor:
William V. Esmond.
By Julius Moses
Atty.

(No Model.) 2 Sheets—Sheet 2.

W. V. ESMOND.
ROLL HOLDING CAMERA.

No. 552,633. Patented Jan. 7, 1896.

Witnesses:
Jno. A. Christianson.
W. C. Coolies

Inventor:
William V. Esmond.
By Julius Moses.
Atty.

UNITED STATES PATENT OFFICE.

WILLIAM V. ESMOND, OF CHICAGO, ILLINOIS, ASSIGNOR OF ONE-HALF TO PATRICK HENRY BETTMAN, OF SAME PLACE.

ROLL-HOLDING CAMERA.

SPECIFICATION forming part of Letters Patent No. 552,633, dated January 7, 1896.

Application filed January 18, 1895. Serial No. 535,421. (No model.)

*To all whom it may concern:*

Be it known that I, WILLIAM V. ESMOND, a citizen of the United States, residing at Chicago, Cook county, Illinois, have invented certain new and useful Improvements in Photographic Cameras, of which the following is a specification.

The object of my invention is to provide a simple, economical, efficient, and compact camera; and the invention consists in the features and combinations hereinafter described and claimed.

Figure 1:
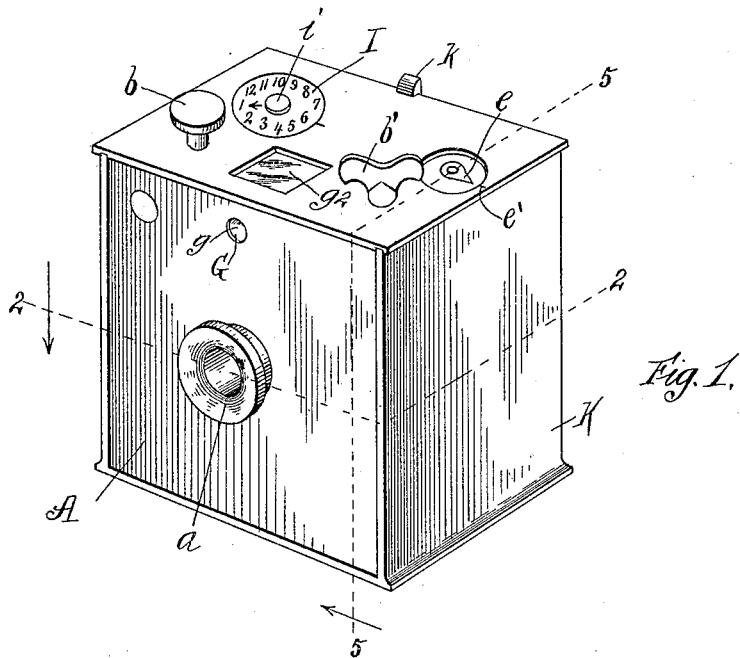
Figure 2:
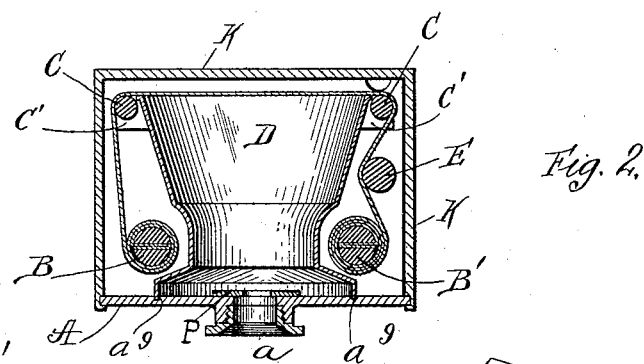
Figure 4:
Figure 3:
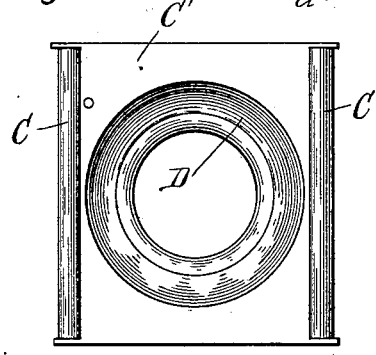
Figure 3:
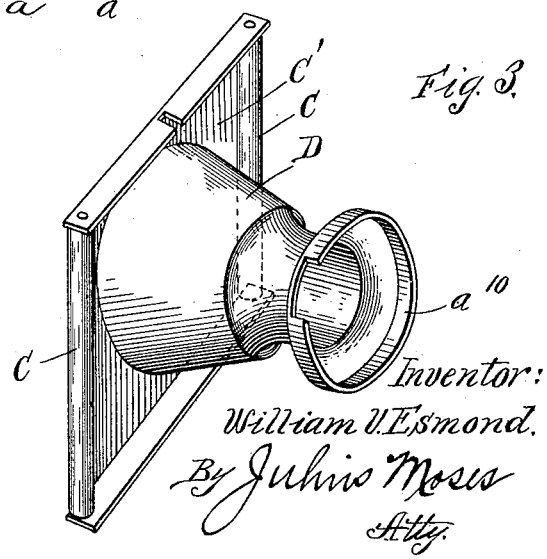
Figure 5:
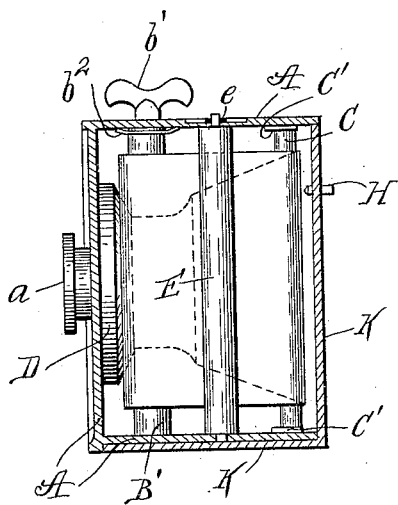
Figure 6:
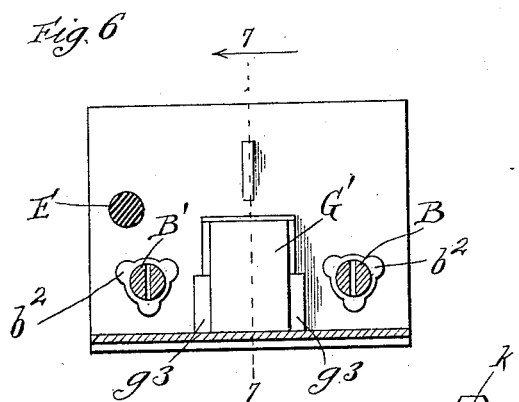
Figure 7:
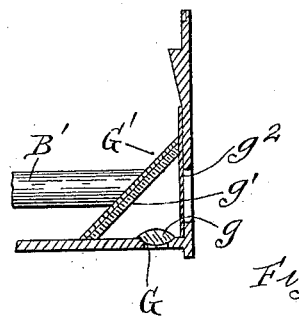
Figure 8:
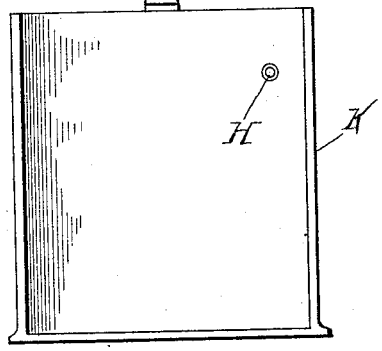

In the drawings, Figure 1 is a perspective view of a complete camera; Fig. 2, a longitudinal section taken on line 2 2 of Fig. 1, looking in the direction of the arrow; Fig. 3, a detached detail view of the light-guard for the film; Fig. 4, a front elevation of Fig. 3; Fig. 5, a vertical section taken on line 5 5 of Fig. 1, looking in the direction of the arrow; Fig. 6, a plan view of a portion of the top of the inclosing-case, looking at it from the interior; Fig. 7, a transverse section taken on line 7 7 of Fig. 6; and Fig. 8, a vertical elevation of a portion of the inclosing-case, looking at it from the interior.

In constructing my improved camera I use a frame portion A, preferably rectangular in transverse vertical section and which supports the lens, film-holder and indicating mechanism, as hereinafter described, so that when such frame portion, which also forms a portion of the inclosing-case, is removed from the case it carries with it practically all of the operative mechanism of the camera. In the front portion of this supporting-frame is the usual lens-opening $a$, which may or may not be provided with a lens, as seems desirable or necessary, and immediately back of the lens-opening is a pivoted shutter P, which may be of any preferred construction and operated by any suitable mechanism to open and to close the said opening.

In order to make a compact camera, or one that occupies the smallest possible space and which may be easily carried in the pocket, I provide a film-holder, which is formed by pivoting at the front portion of the supporting-frame two film-rolls B B', around which the film is wound. These rolls are split or slotted to receive the free ends of the film, one, preferably B, provided with a small knurled handle $b$ and the other with a thumb-nut $b'$, by which they are rotated and the film fed back of the mat in the focal plane when desired or necessary. These rollers are pivoted in the supporting-frame, as above described, near its front portion or adjacent to the lens-opening, which thereby economizes space. In order to bring the film portion into the focal plane or back of the mat, hereinafter described, two small idle-rolls C C are provided, which are pivoted between two bearings or flanges $c$ formed on two sides of the mat C', and the film is passed around these rolls, bringing it into the desired plane to receive the image.

In order to protect the film, except that which it is desirable to expose, from being affected by the actinic rays of light, a light-guard D is provided, which is preferably integral with the mat and is formed approximately in the shape of the frustum of a cone. This guard has its front portion surrounding and inclosing the space between such opening and the focal plane, so that no light whatever, either direct or diffused, may affect any portion of the film but that which is exposed at the opening in the mat. While this light-guard is preferably shown in a shape resembling the frustum of a cone, it may be made in other shapes—as, for instance, the frustum of a pyramid—the only requisite being that it must be so constructed and arranged as to inclose the space mentioned above and prevent the light from affecting in any way the film that is not exposed at the rear or mat opening.

As stated, the two film-rolls B B' are mounted at the front portion of the supporting-frame in order that space may be economized. This arrangement would, in the absence of any special construction of the light-guard, be objectionable for the reason that the space between the guard and the rolls would be insufficient to accommodate the rolls without objectionably increasing the size of the camera-casing, inasmuch as the film on the take-up roll would contact with the side of the guard and thus sustain injury. In order to reduce the cost of production of the light-guard and to prevent the necessity either of increasing the size of the camera-casing or of curtailing the length of the strip of film and at the same time provide for the proper operation of the film-rolls, I form the light-guard with a reduced or throat-like portion $d$ near its outer end, the space formed by such reduction furnishing ample room to admit of the proper operation of the film-rolls without interfering with the light-guard. The advantage of producing the structure shown for the light-guard—that is to say, of reducing the throat or neck portion thereof—is that the same can be performed by spinning, always insuring the production of a light-guard in one piece as distinguished from straight converging surfaces for the sides of the converging portion of the light-guard, to produce which, even if this be attempted by spinning, the divergent portion from the apex of the converging part will frequently, if not always, be broken off, so that the divergent portions leading from the throat will then be a separate piece and will have to be soldered to the throat. By my construction a light-guard can be made in one piece in a single operation. In juxtaposition with the reduced throat portion the film-rollers will then be set, thus economizing space, and the whole construction saving cost.

To render the lens and other parts more accessible, I prefer to make the light-guard and mat in one integral piece, separate and removable from the frame portion. When the mat and guard are thus made removable (see Figs. 2 and 3) the front portion of the frame is provided with a circular groove $a^9$ to receive a circular flange $a^{10}$ formed or provided on the front portion of the guard. The flange $a^{10}$, in conjunction with the front of the supporting-frame, forms a chamber in which the shutter works, a slot $a^{11}$ in the flange affording space in which works the arm or lever for operating the shutter. In order to direct the light-guard to its proper position, and also to prevent side movement of the same, the frame is provided with a lug or guide $a^{12}$ which is engaged by a recess $a^{13}$ in one of the flanges $c$ of the mat.

I will designate the roller B as the one upon which the fresh sensitized film is placed, and B′ the roller upon which it is wound after it has been exposed to the light. Both of these rolls are provided with dish-shaped springs B², which are inserted between the upper shoulder of the roll and its supporting-frame to obtain the desired frictional engagement and prevent the rolls from being turned too easily. The film is drawn from the supply-roll B and passed around the idle-rolls C C until it is engaged with the slot of the take-up roll B′, said roll being rotated by means of a thumb-screw, before described.

In order to indicate when sufficient film has been unrolled on the holder, an indicating-roll E, that is very sensitive to the frictional engagement of the film which is passed around it in the manner shown in Fig. 2, is loosely pivoted to the supporting-frame in a vertical axis and between the take-up roll and one guide-roll C. The upper and outer pivot of the indicating-roll is preferably provided with an index-pointer $e$ to indicate the rotation of the roll, while the roll should be made of a sufficient circumference that during each rotation of it one section of the film will have passed clear across the mat-opening. It will thus be seen that one rotation of the index-pointer from the line $e'$ on the exterior of the frame shows that substantially a new film has been brought into the focal plane. This arrangement dispenses with the usual gear mechanism and is absolutely true in that it will only register or indicate when the film itself has been moved, without any regard to the operation or rotation of the rollers.

To provide what is termed in the art a "finder"—that is, a ground glass projection-surface, upon which the image to be photographed may be seen when brought within the field of view of the camera—I provide the front portion of the frame, preferably near its top, with a second opening G, in which is arranged a lens $g$. In the interior of the case and in angular alignment with the lens is a piece of material provided with a reflecting-surface $g'$, and directly above it and adjacent to a square opening is a piece of ground glass $g^2$, upon which the rays of light as they pass through the lens and are deflected by the reflecting-surface are cast to show the operator when the desired image has come within the field of view. This reflecting-surface is carried by a removable casing $G'$ having flanges $G^2$, which are designed to work between guides $g^3$ on the under surface of the top of the camera-casing, by which arrangement the reflecting-surface casing may be easily removed and the reflecting-surface, lens, or ground glass readily cleaned or replaced.

To mark a film which has been exposed and thus indicate to the operator at what point it should be cut before developing, I provide the rear portion of the case with a push-pin H, arranged at one side of the opening in the mat and provided at its interior with an indenting-point adapted to engage a recess or depression $d^2$ in the mat, so that by pushing in on the same the film is perforated. If this operation is performed every time a fresh film is brought into the focal plane, it will leave such perforations on the film so that the operator can readily perceive at what points it should be cut.

In order to indicate the number of exposures that have been made, I pivot to the upper portion of the supporting frame or case a disk I, which is provided with numerals corresponding to the number of exposures that one film can accommodate. If the holder should contain film enough for twenty-four exposures, this disk will be provided with twenty-four numerals and the pin $i$, upon which it is pivoted, provided with an indicating-point to show how many exposures have been made—that is, every time the exposure is made the disk is moved one step in its rotation—thus bringing a succeeding figure into line with it, which, starting from the numeral 1, would be 2.

To inclose the film-holder and all the parts of the camera completely, I make a case K, which is in the shape of a box, but open at its top and front, into which the supporting-frame, with the film-holder and other parts, is inserted from the top and slipped down into position, when a spring-latch *k* will securely lock the parts together.

It will be observed from the foregoing description that the case proper contains very little of the mechanism of the camera, and that the supporting-frame forms a portion of the inclosing-case and practically contains and supports all the mechanism of the camera. The camera may be provided with any usual or desired shutter and cap; but as these form no material or novel feature of my invention I deem it unnecessary to describe the same here, as such elements are well known to those skilled in the art to which this invention appertains.

The advantages of my improvements are that by the arrangement of the film-holder in placing the rolls at the front portion of the case I am enabled to provide a very compact magazine-camera, and by providing a light-guard I am enabled to place the film-holder at the front portion of the case, while the passing of the film around the guide-rolls so as to pass over the indicating-roll provides a simple indicating mechanism to show the unrolling and forward feeding of the film.

While I have described my invention with more or less minuteness in regard to details and as being embodied in more or less precise forms, I do not desire to be limited thereto unduly any more than is pointed out in the claims. On the contrary, I contemplate all proper changes in form, construction and arrangement, the omission of parts and substitution of equivalents, as circumstances may suggest or render expedient.

I claim—

1. As a new article of manufacture, a light-guard for cameras having a mat provided with rollers, the mat and guard being integral, substantially as described.

2. A light-guard for cameras, having a mat at one end provided with rollers, and a flange at the opposite end for engaging a recess in the camera-frame, substantially as described.

3. In a camera, the combination with a light-guard having a reduced or throat-like portion and an integral mat provided with rollers, of film-rolls mounted contiguous to the said reduced portion, substantially as described.

4. A camera having a projection surface and guides arranged contiguous thereto, in combination with a casing engaging the guides and carrying a reflecting surface, substantially as described.

5. In a camera, a light-guard having an integral mat provided with rollers and with a recess or depression, in combination with a push-pin or marker adapted to engage the recess to perforate the film, substantially as described.

6. A camera having its front side provided with a circular groove and a shutter working in an arc bounded by the groove, in combination with a light-guard having one end provided with a circular flange engaging the groove, said flange being provided with a recess in which the arm of the shutter works, substantially as described.

WILLIAM V. ESMOND.

Witnesses:
JESSE LOWENHAUPT,
PATRICK H. BETTMAN.